(12) United States Patent
Harris et al.

(10) Patent No.: US 8,214,813 B2
(45) Date of Patent: Jul. 3, 2012

(54) CODE OPTIMIZATION ACROSS INTERFACES

(75) Inventors: Timothy Harris, Cambridge (GB); Rebecca Isaacs, Cambridge (GB); Eric Koskinen, Providence, RI (US); Richard Mortier, Oakington (GB)

(73) Assignee: Microsoft Corporation, Redmond, WA (US)

( * ) Notice: Subject to any disclaimer, the term of this patent is extended or adjusted under 35 U.S.C. 154(b) by 1574 days.

(21) Appl. No.: 11/622,796

(22) Filed: Jan. 12, 2007

(65) Prior Publication Data

US 2008/0172662 A1    Jul. 17, 2008

(51) Int. Cl.
*G06F 9/45* (2006.01)

(52) U.S. Cl. ......... 717/151; 717/136; 717/140; 717/141

(58) Field of Classification Search .................. None
See application file for complete search history.

(56) References Cited

U.S. PATENT DOCUMENTS

| | | | |
|---|---|---|---|
| 6,427,234 B1 | 7/2002 | Chambers et al. | |
| 6,966,055 B2 | 11/2005 | Haber et al. | |
| 6,973,646 B1 | 12/2005 | Bordawekar et al. | |
| 6,993,754 B2* | 1/2006 | Freudenberger et al. | 717/153 |
| 7,111,237 B2 | 9/2006 | Chan | |
| 7,120,906 B1 | 10/2006 | Stephenson et al. | |
| 7,263,689 B1* | 8/2007 | Edwards et al. | 717/127 |
| 7,318,215 B1* | 1/2008 | Krishnan et al. | 717/106 |
| 7,451,433 B2* | 11/2008 | Halpern | 717/106 |
| 8,015,544 B1* | 9/2011 | Englehart | 717/106 |
| 2002/0147969 A1 | 10/2002 | Lethin et al. | |
| 2003/0023957 A1 | 1/2003 | Bau, III et al. | |
| 2003/0079215 A1* | 4/2003 | Hundt et al. | 717/164 |
| 2004/0073899 A1 | 4/2004 | Luk et al. | |
| 2004/0111701 A1* | 6/2004 | Beust | 717/108 |
| 2004/0143814 A1 | 7/2004 | de Jong | |
| 2004/0205712 A1 | 10/2004 | Holzle et al. | |
| 2005/0010891 A1 | 1/2005 | Chaiken et al. | |
| 2005/0081192 A1* | 4/2005 | DeLine et al. | 717/126 |
| 2006/0123332 A1 | 6/2006 | Berg et al. | |

OTHER PUBLICATIONS

PCT International Search Report dated Jun. 27, 2008, from corresponding PCT Application No. PCT/US2008/051022, 3 pages.
Auslander, et al., "Fast, Effective Dynamic Compilation", available at least as early as Nov 8, 2006, at <<http://delivery.acm.org/10.1145/240000/231409/p149-auslander.pdf?key1=231409&key2=1479592611&coll=portal&dl=ACM&CFID=11111111&CFTOKEN=2222222>>, ACM, 1996, pp. 149-159.
Chauhan, et al., "Optimizing strategies for telescoping languages: procedure strength reduction and procedure vectorization", Available at least as early as Nov 8, 2006, ICS, Jun. 18, 2001, pp. 1-31.
Chiba, "A metaobject protocol for C++", available at least as early as Nov. 8, 2006, OOPSLA, 1995, pp. 1-15.
Cousot, et al., "Abstract interpretation: a unified lattice model for static analysis of programs by construction or approximation of fixpoints", 1977, pp. 237-252.
Demmel, et al., "Self adapting linear algebra algorithms and software", available at least as early as Nov. 8, 2006, pp. 1-33.
Engler, et al., "Checking system rules using system-specific, programmer-written compiler extensions", Available at least as early as Nov. 8, 2006, pp. 1-16.

(Continued)

*Primary Examiner* — Insun Kang
(74) *Attorney, Agent, or Firm* — Lee & Hayes, PLLC

(57) ABSTRACT

A method of optimizing code which invokes methods on a system across an interface is described. High level information relating to the system is accessed and this information is used in performing code transformations in order to optimize the code.

18 Claims, 12 Drawing Sheets

OTHER PUBLICATIONS

Engler, "Incorporating application semantics and control into compilation", Available at least as early as Nov. 8, 2006, pp. 1-12.

Engler, "Interface compilation: Steps toward compiling program interfaces as languages", available at least as early as Nov. 8, 2006, pp. 1-16.

Frigo, et al., "The design and implementation of FFTW3", available at least as early as Nov. 8, 2006, IEEE, vol. 93, No. 2, 2005, pp. 1-16.

Grant, et al., "An Evaluation of Staged Run-Time Optimizations in DyC", available at least as early as Nov. 8, 2006, at <<http://www.cs.pitt.edu/~mock/papers/pldi99.pdf>>, pp. 1-12.

Griewank, "Evaluating derivatives: principles and techniques of algorithmic differentiation", Available at least as early as Nov. 8, 2006, pp. 166-176.

Guyer, et al., "An Annotation Language for Optimizing Software Libraries", available at least as early as Nov. 8, 2006, pp. 1-14.

Guyer, et al., "Broadway: A compiler for exploiting the domain-specific semantics of software libraries", available at least as early as Nov. 8, 2006, IEEE, pp. 1-14.

Hines, et al., "Optimizing Communication in Embedded System Co-simulation", available at least as early as Nov. 8, 2006, at <<http://www.cs.washington.edu/research/lis/papers/pdf/hines-codes97.pdf>>, pp. 1-5.

Kiczales, et al., "Aspect-Oriented Programming", Available at least as early as Nov. 8, 2006, Springer-Verlag, 1997, pp. 1-25.

Kiczales, et al., "The Art of the Metaobject Protocol", Available at least as early as Nov. 8, 2006, pp. 1-26.

Krintz, et al., "Using Annotations to Reduce Dynamic Optimization Time", available at least as early as Nov. 8, 2006, at <<http://delivery.acm.org/10.1145/380000/378831/p156-krintz.pdf?key1=378831&key2=00831926 11&coll=GUIDE&dl=GUIDE&CFID=5467646&CFTOKEN=17095180>>, ACM, 2001, pp. 156-167.

Krishna, et al., "Context-specific middleware specialization techniques for optimizing software product-line architectures", Available at least as early as Nov. 8, 2006, ACM, 2001, pp. 1-14.

Menon, et al., "High-level semantic optimization of numerical codes", available at least as early as Nov. 8, 2006, pp. 1-10.

Muller, et al., "Fast optimized Sun RPC using automatic program specialization", Available at least as early as Nov. 8, 2006, pp. 1-10.

Vandevoorde, "Exploiting specifications to improve program performance", available at least as early as Nov. 8, 2006, Massachusetts Institute of Technology, 1994, pp. 1-137.

Vandevoorde, et al., "Using Specialized Procedures and Specification-Based Analysis to Reduce the Runtime Costs of Modularity", available at least as early as Nov. 8, 2006, ACM, pp. 1-7.

Veldhuizen, et al, "Active libraries: Rethinking the roles of compilers and libraries", available at least as early as Nov. 8, 2006, Oct. 5, 1998, pp. 1-16.

Wenyin, et al., "Semi-Automatic Image Annotation", available at least as early as Nov. 8, 2006, at <<http://research.microsoft.com/asia/dload_files/group/mediasearching/fu-107-Semi-Automatic-Annotation-4th.pdf>>, pp. 1-8.

* cited by examiner

CODE OPTIMIZATION ACROSS INTERFACES

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Whilst large software systems often appear to work efficiently at a fine granularity, sequences of calls made across software interfaces are often very inefficient and this can be particularly problematic in distributed systems where each such call can incur network communications delays that can seriously degrade performance.

Currently, it is up to the programmer to avoid this kind of inefficiency for example by batching a series of calls together into a single call, or by re-using the result from a first call so as to avoid making a second equivalent call; however, this kind of technique can mean breaking abstraction boundaries in a program to manually re-factor code and in some cases this may not be possible (e.g. where the repeated work is a security check that client code cannot be trusted to perform). Additionally, it often necessary to understand how an application will be deployed before trying to optimize its performance. This can mean that optimization opportunities are lost where it is not known exactly how a set of modules will be used together or that an application may be optimized for a first deployment but the performance of subsequent, different deployments may be impaired as the optimizations which were made are not appropriate.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A method of optimizing code which invokes methods on a system across an interface is described. High level information relating to the system is accessed and this information is used in performing code transformations in order to optimize the code.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
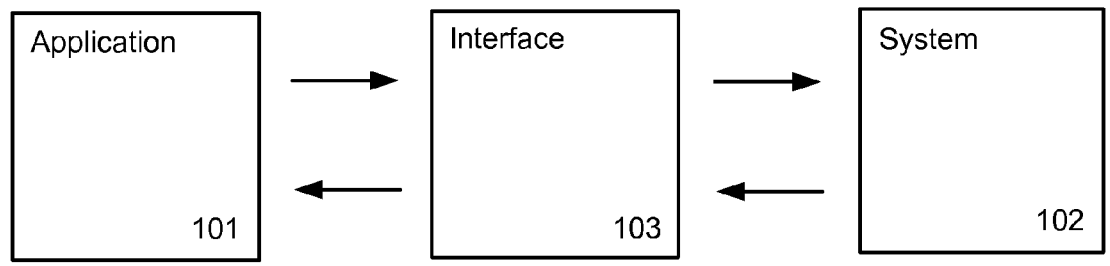
FIG. 1 shows a schematic diagram of an application interacting with a library across an interface.

FIG. 1 shows a schematic diagram of an application 101 interacting with a system 102, such as a library, across an interface 103. The application makes calls across the interface to the library (or other system) which may access data managed by the library. Current code optimization techniques, which are used within a compiler, are limited to the application 101 itself. However, by providing high level information about the library on the other side of an interface additional optimizations can be made. The optimizations may use standard optimization techniques which are extended to make the additional optimizations by using the high level information. Alternatively new optimization techniques may be used which use the high level information.

These optimizations may be made at compile time (e.g. by eliminating redundant calls on an interface) and/or at run time (e.g. by eliminating redundant calls on an interface which are the result of repeated user operations). These optimizations may be particularly beneficial in distributed computing systems where the performance may be limited by the network communication delays between the machines involved (e.g. where there is a significant round trip time for messages to travel from the application to the library and for responses to travel back to the application).

This high level information relating to the library or other system called across the interface provides data relating to elements within the library (or other system) whilst being independent of the specific implementation of the library or system called. This high level information enables a representation of the data in the library to be created and maintained and this representation is referred to herein as the 'abstract state'. The high level information includes the types of facts that should be held within the representation and data on how the facts are affected by method calls across the interface (e.g. by removing stored facts or defining new facts to be stored within the representation). The high level information may be included within the interface or stored separately and accessed when performing the optimization, as described below with reference to FIG. 2.

The term 'interface' is used herein to refer to both the language constructs that C# and Java expose through the interface keyword and, more generally, the sets of operations exposed by remote procedure call (RPC) systems, database stored procedures, system calls, etc.

Whilst many of the examples described herein relate to code which invokes method calls on a library across an interface, this is by way of example only. The abstract implementation and the methods described are also applicable in other situations where method calls are invoked across an interface, including, but not limited to, between software modules on the same machine and between a software module and a remote system.

Figure 2:
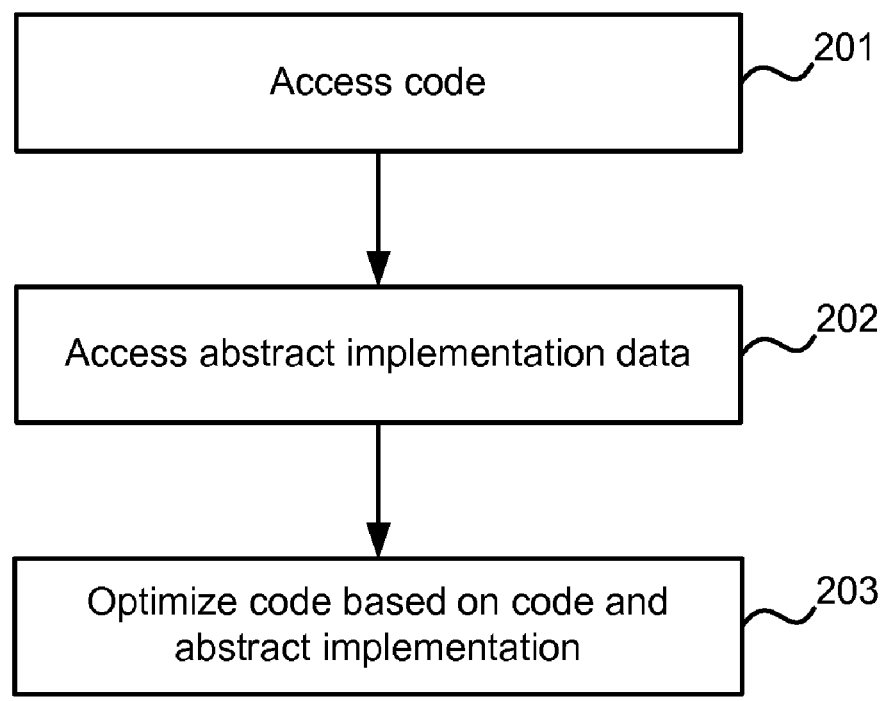
FIG. 2 is an example flow diagram of a method of code optimization across an interface.

FIG. 2 shows an example flow diagram of a method of code optimization across an interface. To perform this optimization, the code to be optimized is accessed (block 201) and the high level information is also accessed (block 202). This high level information is referred to herein as the 'abstract implementation' (also referred to as 'annotations' or 'simplified code'). The code is then optimized based on an analysis of both the code itself and the abstract implementation (block 203). Both the abstract implementation and examples of optimization techniques which may be used are described in more detail below.

A basic example may be described with reference to the following code using a library-implemented extensible array:

```
for (int i = 0; i < v.Count( ); i ++) {
    if (v.GetAt(i) == a) {
        ...
    } else if (v.GetAt(i) == b) {
        ...
    }
}
```

There are several opportunities for optimization of this code because the first call to GetAt makes the second call redundant, and the call to Count would be better placed outside of the loop. Whilst in the above example, the effect of any of the operations may be clear to a human reader (e.g. because in this example the operations are named using words which describe them), this interpretation is not possible by a compiler and also may not be apparent to a human reader where the operations are named generically, for example: Op1, Op2 etc such that the code is:

```
for (int i = 0; i < v.Op1( ); i ++) {
    if (v.Op2t(i) == a) {
        ...
    } else if (v.Op2t(i) == b) {
        ...
    }
}
```

Assuming that, in the example above, GetAt and Count are the only two operations on the array's interface, these transformations may be enabled by annotating the interface to include an abstract implementation as shown below (with the abstract implementation comprising the annotations in square brackets):

```
[FactType("ITEM(int) -> Object")]
[FactType("NUMITEMS( ) -> int")]
public interface ExtensibleArray {
    [Effect("NUMITEMS( ) = return")]
    public int Count( );
    [Effect("ITEM(idx) = return")]
    public Object GetAt(int idx);
    ...
}
```

Figure 3:
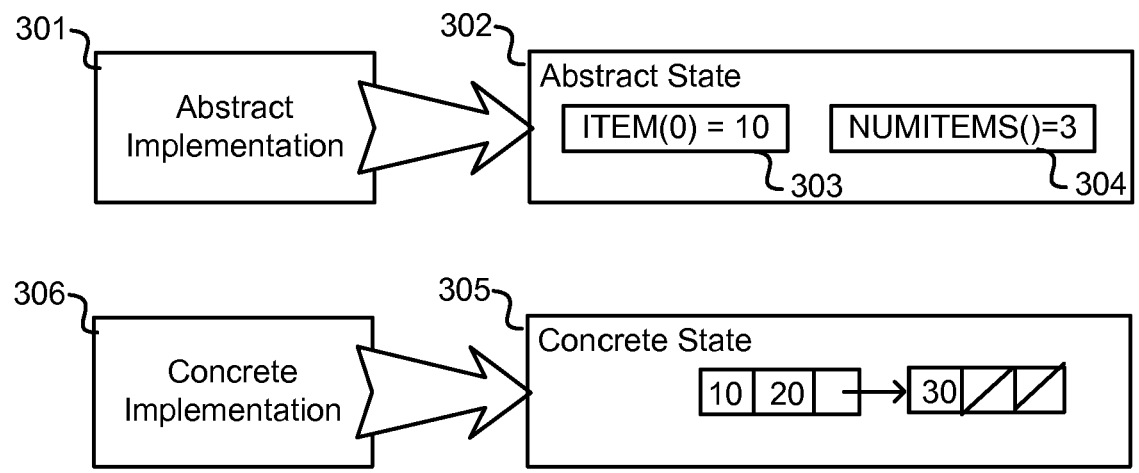
FIG. 3 shows a graphical representation of how the abstract implementation is used to manipulate an abstract state associated with the interface.

FIG. 3 shows a graphical representation of how the abstract implementation 301 is used to manipulate an abstract state 302 associated with the interface. The abstract state 302 comprises a set of facts which are known to be true about the concrete state 305 manipulated through the interface (i.e. the actual state of the system called across the interface) and FIG. 3 shows the abstract and concrete states 302, 305 before the second call to GetAt in the code example above. At this stage the abstract state includes two facts 303, 304: first that the value of index 0 is 10 (obtained from the first GetAt call) and second that there are three items in the array (obtained from the Count call).

In the example shown above, FactType definitions identify the kinds of fact that will be kept in the abstract state. FactType definitions play a role analogous to variable declarations in a programming language such as C#: an implementation can report an error if a fact is defined whose parameters are not consistent with the corresponding FactType definition. An alternative implementation can omit the use of FactType definitions, thereby reducing the size of abstract implementations but also losing the ability to produce such error reports.

In the example shown above, Effect statements describe how this abstract state is affected by subsequent method calls (e.g. by removing or defining facts relating to the operation that is being invoked). For example, the call GetAt (int idx) has the Effect statement "[Effect("ITEM(idx)=return")]" which defines a fact that relates a particular index number ("idx") with the value returned by the call to GetAt ("return"). This fact is stored in the abstract state and allows the second call to GetAt(0) to return the value 10 without requiring a second call to GetAt(0) to be issued to the library. In contrast, in this example, a later call to GetAt(1) would need to be invoked on the concrete implementation because the abstract state in FIG. 3 does not hold any ITEM(1) fact. Other examples of the language which may be used in the abstract implementation are described in more detail below.

In order to implement the above optimization of the calls to GetAt(0) at compile time, the code would be transformed to cache the value returned from the first call to GetAt(0) such that it can be used to respond to the second call to GetAt(0) without requiring the call to the library to be issued. In order to implement the above optimization of the calls at run time, a proxy may be generated to store the abstract state (e.g. as shown in FIG. 3).

The facts in the abstract state 302 represent an approximation of the state 305 of a concrete implementation 306, and the absence of a fact indicates the absence of knowledge, as opposed to (for example) knowledge of the absence of an item in a particular data structure. Missing facts may lead to lost optimization opportunities; however, this is a conservative approach which avoids missing facts leading to unintended transformations. Unknown states are not explicitly held within the abstract state. The size of the abstract state may be controlled and therefore may not hold all the available facts.

The abstract implementation may be written by the programmer when writing the library code or may be created subsequently by the programmer or another programmer. As described above, the abstract implementation may be stored together with the interface or separately.

In some examples, the abstract implementation may be checked to ensure that it is true to the concrete implementation. This ensures that any code transformations that are performed based on the abstract implementation will not change the behavior of code. The checking may be performed statically (e.g. using a tool that examines the abstract implementation and the concrete library implementation) or dynamically.

In one implementation dynamic checking may be achieved by providing an abstraction function for the library being tested that maps its internal concrete state to a set of facts in the abstract state. For instance, in the list-based set example shown above and in FIG. 3, one such abstraction function creates the facts "ITEM(0)=10", "ITEM(1)=20", "ITEM(3)=30", "NUMITEMS( )=3" representing all of the facts that are consistent with concrete state 305. The test tool then invokes operations and compares the facts generated by the abstract implementation ($F_a$) against the facts derived by the abstraction function from the concrete implementation ($F_c$). An error is reported if $F_a$ contains a fact not in $F_c$ as this indicates that the abstract state includes knowledge that cannot be derived from the concrete state.

In order that the abstract state can be maintained in conformance with the concrete state, the concrete state should only be manipulated through the annotated interface. This ensures that changes made to the concrete state result in the correct changes being made to the abstract state. For example, where data in a database is accessed through an interface based on stored procedures, other parts of the program should not access the underlying data directly by issuing update commands (such as SQL UPDATE commands). Similarly, a file-based data access interface should not be bypassed by accessing the underlying blocks on disk or the abstract state will no longer match the concrete state and errors will occur.

Problems may also occur where multiple clients access the same system (e.g. multiple processes accessing the same database, or multiple threads accessing the same data structure within a single process). In such a situation, the interleaving of operations between different clients prevents sequential reasoning within a client. There are a number of approaches which address this issue. A first approach is to introduce the notion of a volatile object. In this approach a programmer indicates that an object is "volatile" which means that optimizations are disabled on calls to the object. Volatility can be indicated in several ways. In one implementation volatility is indicated when an object is created (for example by "new" in an extension to the C# language). In another implementation volatility is a property of object references rather than objects (for example by a type such as "volatile Object" in an extensions to the C# language). In another implementation volatility is a property of classes or other data type definitions from which objects are instantiated. Another approach, in software structured using transactions, is to leverage the fact that reasoning occurs sequentially within a transaction by allowing optimizations inside a transaction, but not across transaction boundaries. A further approach for dynamic optimization in distributed systems is to generate a proxy (as part of the program transformations) which interfaces between all the clients and the system (e.g. the database). The proxy also interacts with the abstract state (e.g. using invalidation messages or leases) such that the abstract state is maintained in conformity with the concrete state even where it is manipulated using multiple clients. An example of this use of a server-side proxy is described in more detail below with reference to FIGS. 9-11.

The abstract implementations described above may be used to automatically drive program transformations, as shown in the examples described below. The abstract implementations may be used at compile time to extend the reach of traditional optimizations based on data flow analyses and the same implementations can be used at run time (in addition to or instead of use at compile time) to optimize sequences of database queries, remote procedure calls, etc. These program transformations may include elimination of code (e.g. redundant calls), reordering of code (e.g. moving calls outside a loop) and generation of code (e.g. generation of proxy code to cache results, calling methods speculatively to obtain data in advance of it being required etc). Examples of these transformations are described in more detail below.

The language which may be used in the abstract implementations may be described in more detail with reference to the following example which shows an interface (a generic IDictionary interface):

```
public interface IDictionary<TKey, TValue> {
    public void Put(TKey key, TValue value);
    public TValue Get(TKey key);
    public void Remove(TKey key);
    public void Clear( );
    public int Count( );
}
```

The dictionary maps between keys of type TKey and values of type TValue. The Put method creates a mapping (replacing any existing one for the same key), Get returns the current mapping for a given key (raising a KeyNotFoundException if there is no such mapping), Remove removes the mapping (if any) for a key, Clear removes all of the mappings, and Count returns the number of mappings currently held in the dictionary. A version of the interface including abstract implementations which summarize the effects of the methods is shown below:

```
[FactType("MAPPING(TKey) -> TValue")]
[FactType("COUNT( ) -> int")]
public interface IDictionary<TKey, TValue> {
    [Effect("MAPPING(key) = value; COUNT( ) = ?")]
    public void Put(TKey key, TValue value);
    [Effect("MAPPING(key) = return")]
    public TValue Get(TKey key);
    [Effect("MAPPING(key) = throw KeyNotFoundException;
        COUNT( ) = ?")]
    public void Remove(TKey key);
    [Effect("MAPPING(*) = throw KeyNotFoundException;
        COUNT( ) = 0")]
    public void Clear( );
    [Effect("COUNT( ) = return")]
    public int Count( );
}
```

In this example there are two kinds of attribute added to the code:

FactType: this defines the structure of a new kind of fact that will be maintained in the abstract state. For instance, FactType("MAPPING(TKey)->TValue") defines a new type of fact, called a MAPPING which associates a value of type TValue with a key of type TKey. Similarly, FactType("COUNT( )->int") says that a single COUNT fact can be held for each IDictionary.

Effect: this is used to write the abstract implementation for an interface method. For example, part of the abstract implementation of Put is MAPPING(key)=value, adding a MAPPING fact to the abstract state to associate the key and value being passed to Put.

The example illustrates various kinds of expression that can be used in an Effect attribute:

Parameter names of the methods on which the attribute is placed (e.g. key, value on Put).

The keyword return which refers to the result of the method on which the attribute is placed—either an actual return value, or an exception that the method raises.

Constant expressions, such as 0 and null.

The wildcard symbol * which can be used on the left hand side of an assignment to match any possible value e.g. "MAPPING(*)=null" indicates that calling Clear has the effect of mapping every key to null in a dictionary conforming to this interface.

The "unknown" symbol ? which can be used on the right hand side of an assignment to indicate that any facts known about a portion of the abstract state should be removed e.g. "COUNT( )=?" in Put's effect indicates that the COUNT value is no longer known after putting an item into the table (a Put will increase the count if a new item is added, but leave it unchanged if the item is already in the dictionary). These unknown values are not held explicitly in the abstract state, as described above.

The expression throw ExnClass can be used on the right hand side of an assignment to show when the invocation of one method will guarantee that an exception will be raised by a subsequent method call whose result is derived from the abstract state: for instance, looking up any key will produce an exception after calling Clear.

There are three aspects of abstract implementations that the above example showing the IDictionary interface does not include. The first is that a third attribute, DefaultEffect, can supply an abstract implementation for a method without its own Effect definition. For example, the annotation [DefaultEffect("MAPPING(*)=?; COUNT( )=?"] indicates that other operations on the interface will leave the dictionary in an unknown state.

The second property that the above example does not introduce is that a FactType definition can prefix object reference types with a * to indicate that structural equality should be used rather than simple reference equality when accessing the facts: in one implementation based on the C# programming language the object's Equals method is used in place of equality tests, and Clone method in place of reference assignments. This is typically used when caching objects that must be explicitly cloned rather than re-used directly.

The final aspect of the design that the IDictionary example does not use is the fact that an abstract implementation can refer to the results of property accessors defined on the interface (in the Java programming language these would correspond to Get* methods). This allows one method's abstract implementation to indicate that its behavior depends on state encapsulated by the interface as well as values passed by its parameters. The property accessors can themselves be associated with abstract implementations. This is shown in the LDAP query method example described below.

The facts manipulated by the abstract implementation can be depicted with the notation Name(v1,v2, . . . ,vn)->v. Name identifies a particular fact type, matching one of the n-ary FactType definitions on the interface. Parameters v1 . . . vn are values of the types on the left hand side of the corresponding FactType definition, and result value v is either (i) a value of the type on the right hand side of the FactType definition, (ii) a special value identifying an exception class (throw ExnClass), or (iii) an 'unknown' value (?1, ?2, . . . for an infinite number of distinct unknown values). Initially the abstract state contains no facts as each possible set of parameter values is associated with a distinct unknown value. This may be referred to as an 'empty' abstract state as it contains no useful information. For instance, in the IDictionary example described above, there would be a MAPPING fact associating each value of type TKey with a distinct unknown value.

Assignments in Effect attributes update the abstract state by replacing the result values associated with one or more sets of parameters. The particular facts to update are selected by matching the results of the expressions on the left hand side of the assignment, and the facts' parameter values. A wildcard symbol, *, matches any value. Executing an assignment of the "unknown" symbol, ?, produces a new unknown value, distinct from all existing ones. Although as described above, these unknown values are not explicitly stored in the abstract state, but instead indicate that facts already held within the abstract state should be deleted.

If FactType attributes are present then the assignments made in Effect attributes are checked against the types in a FactType attribute. In general, the type of an expression in an Effect attribute must be assignable to the type at that position in a FactType attribute. There are three exceptions to this: (i) throw expressions are assignable to any type, (ii) unknown expressions (?) are assignable to any type, but (iii) return expressions can only be used where the method's return type is assignable to and from the type at that position in the FactType attribute. As described below, this last condition is needed because return can be used both when adding a new fact to the abstract state, and also when returning a cached value without calling a method.

There are a number of different program transformations which may be performed based on the abstract implementation, including elimination and/or re-ordering of code where one sequence of calls is equivalent to another in terms of its effect on the encapsulated state and generation of code when values returned to the program can be derived from the abstract state without actually invoking an operation on the concrete implementation (e.g. generation of proxy code). To determine what transformations a compiler or run time system may perform, correctness criteria are defined and these may be used by a programmer writing the compiler or run time system to design algorithms (such as the extensions to common subexpression elimination and dead code elimination described below) to ensure that its transformations are allowed, while operating with more limited knowledge (e.g. because of ambiguous control flow at compile time, or because of limited memory for maintaining the abstract state at run time). To generate the correctness criteria, the possible transformations are defined in terms of an abstract state maintained with complete knowledge, i.e. exactly according to the abstract implementation supplied by the programmer, rather than in terms of the actual state that a given implementation may maintain.

Figure 4:
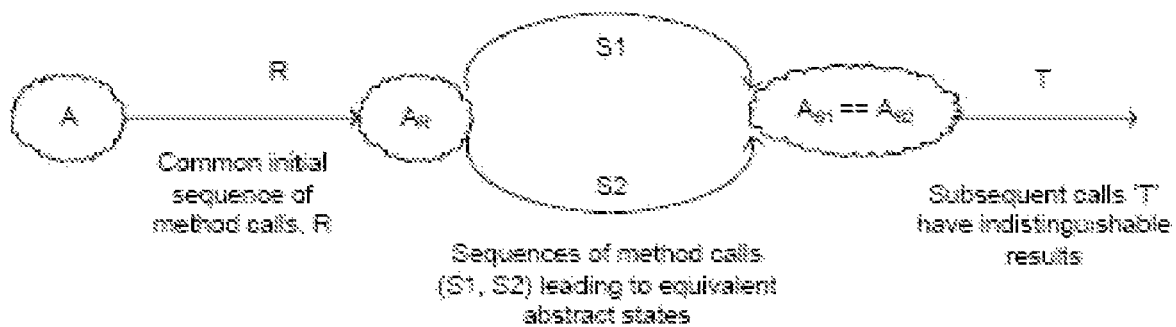
FIG. 4 is a graphical representation of a first correctness criterion.

Equivalent sequences of calls are determined according to a first correctness criterion which states that if two series of method calls reach equivalent abstract states, then the corresponding concrete states must be indistinguishable. Abstract states are compared on a fact-wise basis, noting that each assignment of the unknown symbol (?) produces a distinct unknown value. This criterion can be described with reference to the graphical representation shown in FIG. 4. Starting from the abstract state $A_R$ reached by a series of method calls R consider the execution of further series of calls S1 and S2 reaching abstract states $A_{S1}$ and $A_{S2}$ respectively, and then the subsequent execution of a further common series of method invocations T. For all series of method calls R and T, if $A_{S1}=A_{S2}$ then the invocations in T must return the same results executed after R followed by S1 as after R followed by S2. This definition allows the compiler or run time system to modify method calls (e.g. simplification of the method call sequence) in cases where it has no side effect on the abstract state. Three example code transformations are:

- Removing one or more calls which do not have any side effect on the abstract state (e.g. "Remove(10); Remove(10)"->"Remove(10)")
- Re-ordering calls whose effects are commutative on the abstract state. (e.g. "Remove(10); Remove(20)"->"Remove(20); Remove(10)"). This transformation may be useful if it then lets an earlier call be moved from inside a loop to outside a loop, and thereby be performed fewer times.
- Replacing a sequence of calls A,B,C with a call to D if it is equivalent and preferable to execute than sequence A, B, C. This decision may be made based on program profiling about how long different operations typically take, or by adding additional annotations to express the relative preference of operations.

Figure 5:
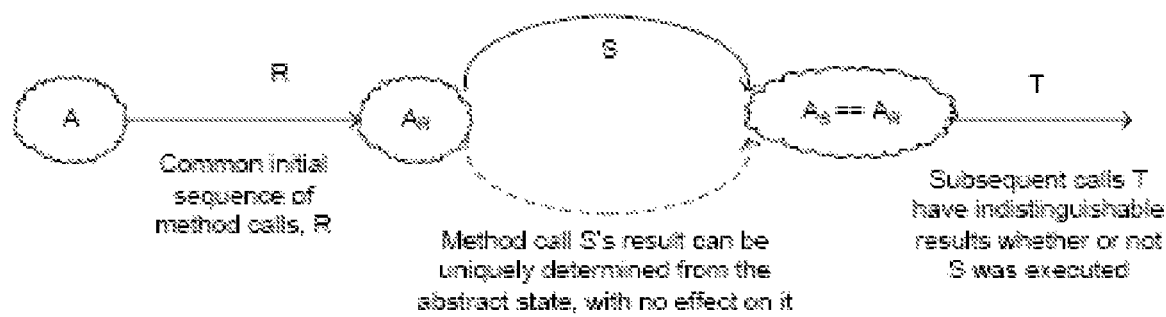
FIG. 5 is a graphical representation of a second correctness criterion.

In the case of methods with return values, the return value needs to be known in order to decide whether or not the abstract state is changed and as a result to determine how the program can be transformed. For example, the attribute on Get in the IDictionary example above will change the abstract state if one call to Get were to return a different value from a previous one on the same key. Such a situation may be addressed by using Effect attributes to derive a result for a method from the abstract state. If the set of assignments in an Effect attribute can be satisfied by binding a unique value to return such that (i) the value is either a normal value or a throw value (i.e. not an unknown), and (ii) the resulting binding means that there is no effect on the abstract state, then the result can be returned without invoking the underlying method. This comprises the second correctness criterion, which states that if a method's return result can be derived from the abstract state, with no side effect on it, then subsequent method calls must be indistinguishable whether or not it is actually called. This criterion can be described with reference to the graphical representation shown in FIG. 5. Starting from the abstract state $A_R$ reached by a series of method calls R consider the execution of a further call S reaching an abstract state $A_S$, and then the subsequent execution of a further series of method invocations T. For all series of method calls R and T, if $A_S=A_R$ then the invocations in T must return the same results irrespective of whether S was executed or not.

The use of the correctness criteria can be described with reference to a simple example of an interface to a bank account supporting four operations and maintaining a fact in the abstract state about the account's balance:

```
// Return the account's balance
[Effect("BALANCE( ) = return")]
public int GetBalance( );
// Remove all money from the account
[Effect("BALANCE( ) = 0")]
public void StealBalance( );
// Credit amount n to the account
[Effect("BALANCE( ) = ?")]
public void Credit(int n);
// Credit interest at rate t% to the account
[Effect("BALANCE( ) = ?")]
public void ApplyInterest(float t);
```

In this example the attribute on GetBalance will allow the result of one call to be re-used subsequently because the correctness criteria will be satisfied. For example using the extended common subexpression elimination algorithm, described below, the two subsequent calls to "GetBalance" would be analyzed in turn. After the first call the abstract state would include the fact "BALANCE( )=xxx" (where the balance is xxx). This satisfies condition (ii) when the second call is analyzed. The attribute on StealBalance allows a series of thefts to be reduced to a single one, because the correctness criteria will be satisfied. However, the use of unknown values in Credit and ApplyInterest shows that these operations will take the account's state to potentially different unknown states and therefore no transformations in relation to these operations are possible unless the balance is subsequently stolen before being queried.

A further possible code transformation can be described with reference to the above bank account example. An optimizer may make suggestions for improving efficiency through improved interface definitions. For example, if ApplyInterest(.) returned a new balance rather than causing the new balance to become an unknown ([Effect("BALANCE( )=?")]), the subsequent calls to GetBalance may be avoided. This may be determined by the optimizer since ApplyInterest(.) only updates one fact, which is the return of another interface method and itself returns a void for that fact. In such instances, the void return may be replaced with a more useful return (e.g. the new balance in this example).

Static Optimization

As described above, these correctness criteria may be used in code transformations at compile time (static optimizations) or at run time (dynamic optimizations). Optimization at compile time may, for example, use common subexpression elimination (CSE) and/or dead code elimination (DCE) to remove redundant code. CSE removes redundant operations based on a forwards data flow analysis (e.g. removing a later operation when its result is available from an earlier one), whereas DCE removes calls that are made redundant by a later operation (e.g. removing an earlier operation that performs an update that is later overwritten without being read). These two techniques are described in more detail below. Whilst these two techniques are described by way of example, it will be appreciated that other optimization techniques may also use the abstract implementation to enhance their performance.

CSE seeks to eliminate redundant computation of the same expression. It is based on available expression analysis which is a forwards data flow analysis that produces a set, avail(n), which for any instruction n, includes all of the expressions that are available at that instruction, i.e. expressions that are guaranteed to be evaluated on all paths that lead to n, without any of the variables they depend on having been invalidated. For instance, considering the following code:

1 z1=s+t;
2 z2=u+v;
3 if (p){
4 u++;
5 }
6 z3=s+t;
7 z4=u+v;

The expression s+t is available at instruction 6 because its value was computed at instruction 1 and neither nor t has been updated between those lines. Conversely, the expression u+v is not available at instruction 7 because the value computed at instruction 2 may be out of date because of the update to u at line 4.

Formally, the set avail(n) of expressions available at the start of instruction n satisfies the dataflow equation:

$$\mathrm{avail}(n) = \bigcap_{p \in \mathrm{pred}(n)} (\mathrm{avail}(p) \backslash \mathrm{kill}(p) \cup \mathrm{gen}(p))$$

where pred(n) is the set of instructions that precede n, kill(p) is the set of expressions that p may invalidate, and gen(p) is the set of expressions that p may compute. For instance, gen(6) is s+t, and kill(6) would contain all expressions (if any) dependent on z3.

Any fixed-point solution to the dataflow equations is safe, and so an implementation typically proceeds by starting with an over-approximation in which avail(n) is conceptually a set holding every possible expression, and then the values of avail(n) are iteratively updated until a fixed point solution is reached.

Using the abstract implementation, the available expression analysis is extended to model, for each instruction, a set of facts which are guaranteed to be in an interface's abstract state. Given the result of this analysis, the correctness criteria (as described above with reference to FIGS. 4 and 5) can be used to identify method calls that can be eliminated: if a method's abstract implementation has no effect on the abstract state at a given point, then its effect on the concrete state must be indistinguishable. To do this, facts from the abstract state are represented by values of the form r:Name(v1,v2, . . . ,vn)->v in the dataflow analysis, where r is a reference to the object whose abstract state holds this fact, and the remainder of the terms are as described above. Facts with ? on their right hand side are not held explicitly as they are unknown.

The definition of gen(p) is extended to include facts added to the abstract state by executing p, and the definition of kill(p) to include facts removed from the abstract state. Facts can be removed by either (i) explicitly storing ? into an object's abstract state, (ii) replacing an existing fact with a new one with the same left hand side, (iii) updating a value on which an existing fact depends, or (iv) invoking a method on an object reference that may be aliased with the one that a fact relates to. For instance, a fact I1:CONTAINS(r1)=True, indicating that list referred to by I1 contains element r1, would be removed by an update to the reference r1 (because the object that r1 now refers to may not be in the list), or by an invocation of a method on any other object reference I2 where I1 and I2 may refer to the same object.

DCE seeks to remove computation that has no effect on the program's subsequent behavior, for instance, because it computes a value and stores it in a variable that is never read. Abstract implementations can be used as the basis of a backwards dataflow analysis to identify opportunities for this kind of transformation. In particular, it can be determined that a given fact is inevitably assigned to an object's abstract state at a given instruction if all paths through the program from that point will assign that fact to the abstract state before any conflicting update to the abstract state. If a method call's effects on the abstract state are overwritten by inevitable assignments then the correctness criteria described above (and shown in FIGS. 4 and 5) allow it to be removed because the method call in question, followed by those making the inevitable assignments, is equivalent to just those making the inevitable assignments. In a simple example, if a first method call sets the value of index 1 as equal to 1, a second method call sets the value of index 1 as equal to 2 and a third method call reads the value of index 1, the first method call can be removed. As with available expression analysis, the DCE analysis must be conservative in how method calls are made through object references that may alias one another, and in how updates to variables or fields may affect facts known about the abstract state.

Dynamic Optimization

In addition to, or instead of, using the abstract implementation to optimize code at compile time, the abstract implementation can be used for optimization at run time (dynamic optimizations). At run time the optimizations may, in many examples, be more effective than optimizations at compile time because: first, transformations can be based on the program flow and parameters seen in a particular program execution, rather than needing to be safe for any execution. Second, transformations are based on exact knowledge of which object a given object reference refers to, rather than needing to conservatively consider aliasing. Thirdly, transformations can operate when calls come from modules that are compiled separately. Finally, transformations can be based on user-supplied notions of object equivalence rather than just reference equality; for example two distinct objects can be treated as equal because corresponding fields of the objects hold the same values as one another. However run time transformation does have a disadvantage in that implementing code to detect opportunities for run time transformation incurs storage costs (e.g. to store the abstract state) and computation costs (e.g. to update and query the abstract state). As a result, use of such dynamic optimizations is best suited to operations on interfaces with significant redundancy and which already take a significant time to execute (e.g. for distributed systems). In these settings the additional cost of deciding whether or not to transform operations on the interface is less than the anticipated savings.

Figure 8:
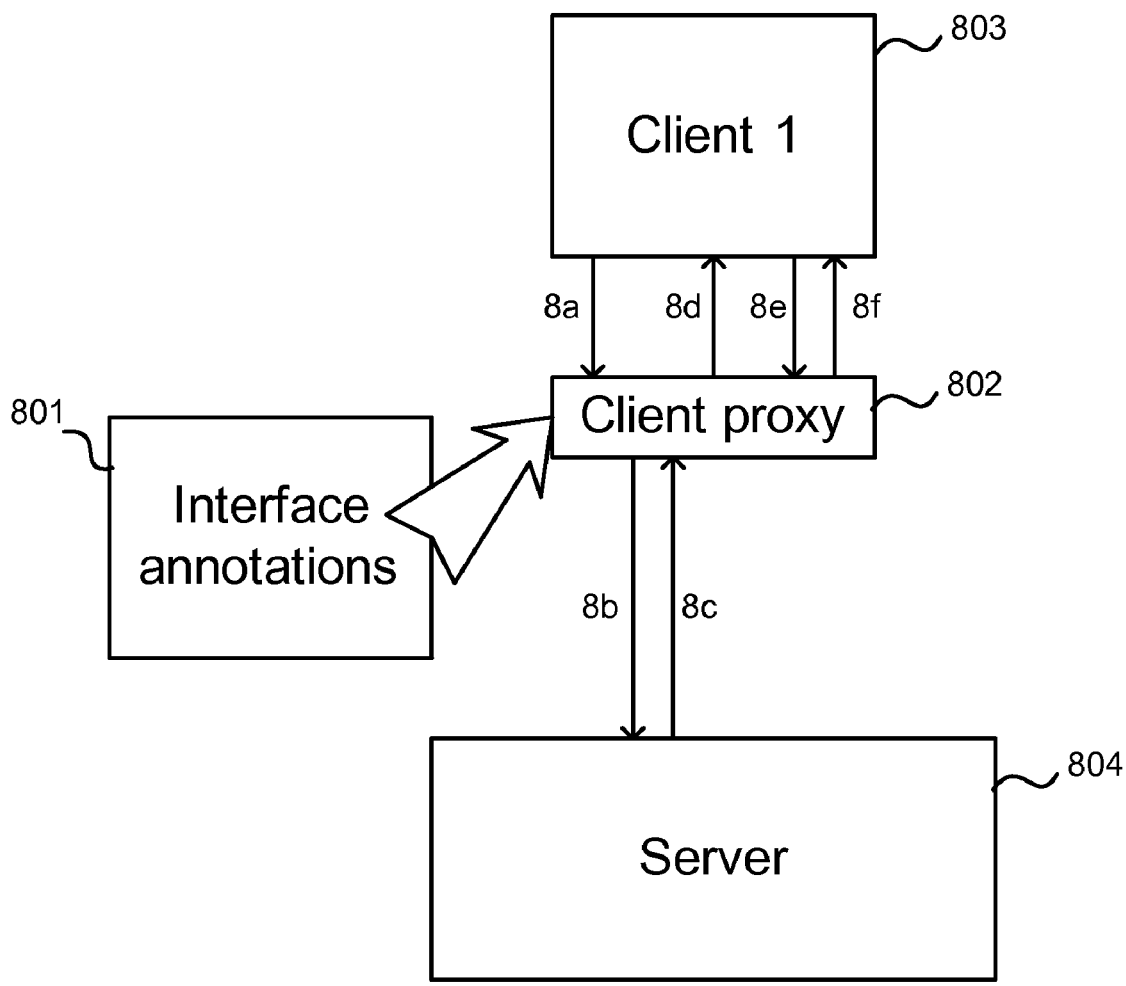
FIGS. 8-11 show four example applications for the code optimizations.

To perform the optimizations at run time, a set of facts that must be present in an interface's abstract state are tracked and the interaction between this state and operations' abstract implementations are used to identify and avoid redundant method calls. In one implementation this is done by generating a proxy implementation of the interface (as depicted in FIG. 8) with which the client interacts instead of interacting directly with the underlying implementation of the interface. The proxy holds the abstract state and updates it according to the abstract implementation as invocations and responses occur.

Although a run time system can intercept all calls on the object in question, in some implementations the set of facts recorded at run time may comprise a subset of the complete abstract state. This may be because there is a limit on the amount of storage used to track this state and when this is reached state information may be shed or not stored. This may also be due to only allowing transformations within transactions (as described above).

CSE, described above in relation to its use at compile time, can also be implemented at run time. Initially the abstract state is empty (i.e. all facts conceptually map to distinct unknown states) and the effects of each operation invoked are iteratively applied to the abstract state. Method calls may then be eliminated according to the correctness criteria described above with relation to FIGS. 4 and 5: firstly, if an operation which does not return a value (such as a method with a void return type in the C# programming language) has equivalent abstract states before and after invocation and secondly, if the abstract implementation of an operation with a non-void return type provides a unique binding for return which provides equivalent abstract states before and after invocation. In each case, if the abstract implementation is true to the concrete implementation (e.g. as tested by methods described above) the operation will have no observable effect on the object's concrete state.

Figure 6:
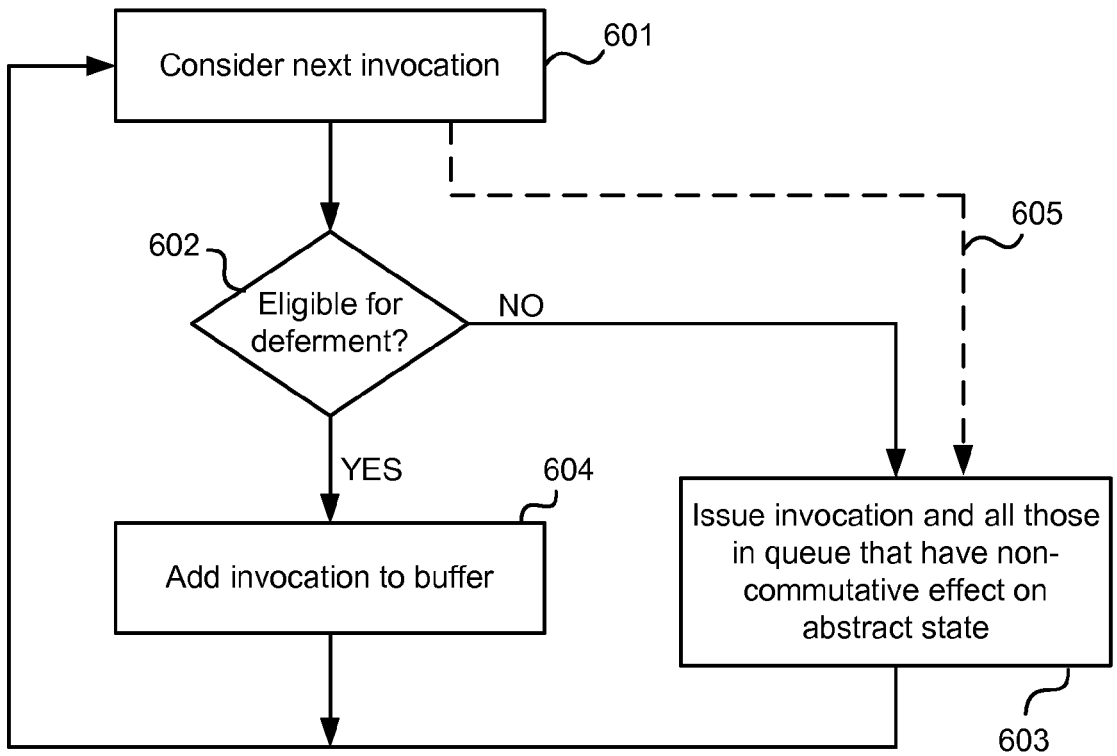
FIG. 6 is an example flow diagram of a method of code optimization at run time.

DCE, as described above in relation to its use at compile time, is implemented as a backwards data flow analysis. Such backwards flow analysis is not possible in real-time because it is not possible to know which operations will be called in the future. However, DCE may be implemented on groups of operations by buffering operations in a deferred method queue, in the hope that a later operation will allow a deferred method to be removed from the queue without being issued to the underlying object. Furthermore, the accumulated operations can be issued in a batch rather than sequentially. This is shown in the example flow diagram of FIG. 6.

In an example, only certain methods may be eligible for deferring: they must not return values (i.e. have void return type in the C# programming language), and the parameters of their abstract implementations must be marked as cloneable with * in the FactType definitions because the parameters are cloned to buffering invocations in the queue. These conditions for deferring are referred to as predefined criteria for deferment of a method call.

The deferred method queue holds an ordered series of invocations $m_1 \ldots m_n$ and corresponding overlays that those methods perform on the abstract state, i.e. a set of facts that they add (gen($m_i$)), and a set of facts that they remove (kill ($m_i$)). On execution of the next method $m_{n+1}$ (block 601), there are two cases to consider:

If $m_{n+1}$ has a non-void return type ('no' in block 602), then it must be issued (block 603), along with any preceding operations in $m_1 \ldots m_n$ that are not guaranteed to commute with it in their effect on the abstract state.

If $m_{n+1}$ has a void return type then it is eligible for deferment ('yes' in block 602) and its invocation is appended to the queue (block 604).

Furthermore, at any time, the system can issue any of the operations in the deferred method queue so long as all of the preceding operations are guaranteed to be commutative in their effects on the abstract state (indicated by the dotted arrow 605). One reason for doing this is if the abstract state overlays represented by the sets gen($m_i$) and kill($m_i$) becomes voluminous.

Whilst CSE and a modified form of DCE are described by way of example as two optimization techniques which may be used in combination with the abstract implementation at run time, it will be appreciated that other optimization techniques may also benefit from the additional information provided by the abstract implementation and may be used in addition to or instead of one or both of these techniques. These other optimization techniques may be extended using this additional information in a corresponding manner to CSE and DCE as described herein.

Figure 7:
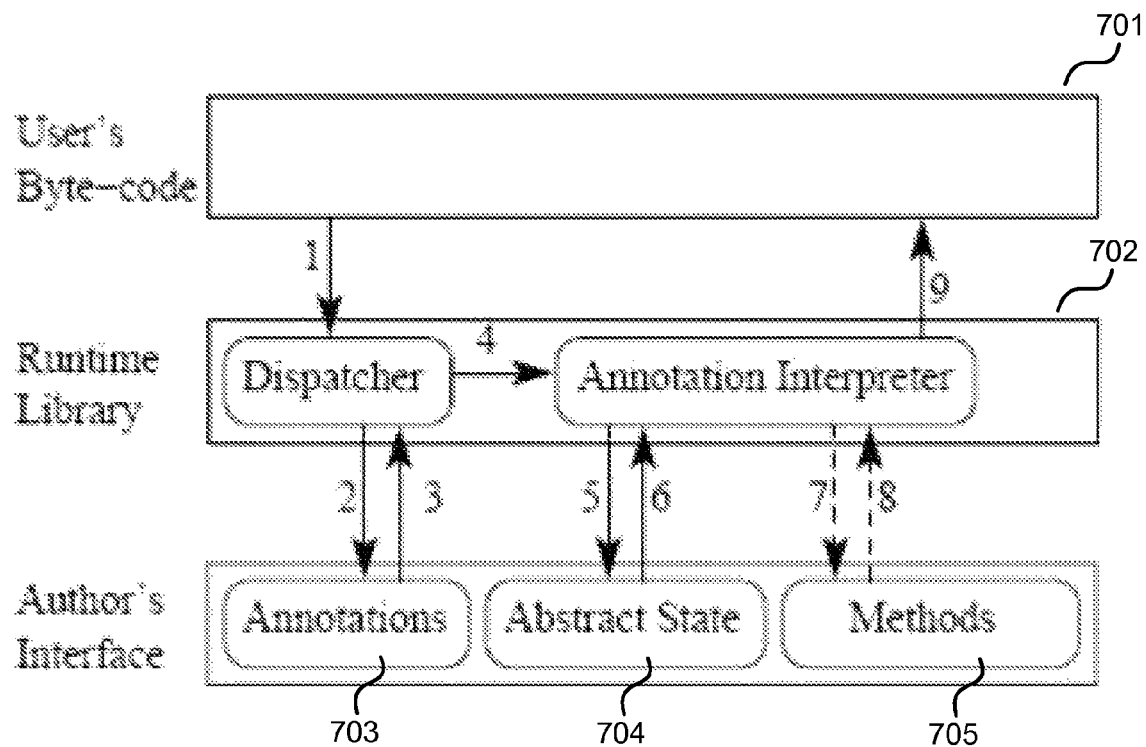
FIG. 7 is a schematic diagram showing the structure of an implementation.

The techniques described above may be implemented in many ways. An example implementation of the dynamic optimization schemes running on Version 2 of the .NET Framework can be described with reference to FIG. 7 which shows the structure of the implementation. The code being optimized (referred to here as 'user's bytecode') 701 is rewritten so that classes that implement interfaces with abstract implementations wrap each of the operations with a call (arrow 1) to a run time library 702 that is responsible for processing the abstract implementations 703 (arrows 2 and 3) and the abstract state data 704 (arrows 5 and 6) and is also responsible for deciding whether or not to call the underlying method 705 (arrows 7 and 8).

Abstract implementations may be read at run time via the .NET System.Reflection library and where the methods being called involve network communication or database access this adds a negligible run time cost. In an alternative implementation dynamic bytecode generation may be used to compile the abstract implementations to bytecode which could then be compiled to native code by the .NET Framework.

At run time, each object's abstract state may be represented as a number of dictionaries holding the facts that are currently known. For instance, if an object has facts such as Name(v1, v2, ..., vn)->v then it will have a dictionary holding all Name facts, and each entry in the dictionary will map from keys (v1, v2, ... vn) to values v. Keys not present in the dictionary conceptually map to distinct unknown values. A wildcard, such as MAPPING(*)=null, introduces a distinct wildcard value to represent * in any position in the key. When a wildcard fact is inserted, any existing facts that match the wildcard are deleted. Non-wildcard facts take precedence over wildcard ones, so wildcard facts effectively serve as default values.

The abstract implementation may be written as part of the interface, as shown in the examples above, or may be written separately and be accessed upon optimization.

EXAMPLE APPLICATIONS

There are many different applications for the methods described above and four examples can be described with reference to FIGS. 8-11. These examples relate to a banking application accessed over an RPC interface by multiple clients. Whilst a banking application is used by way of example, the methods described relate to any distributed computing application.

In the situation shown in FIG. 8, the abstract implementation 801 is used to generate a client-side proxy 802 that tracks invocations and responses made across the interface. If a single client 803 makes repeated requests for the balance of the same account: the proxy records the parameters and result from the first request (arrows 8a-8d), and supplies the same result to the second request (arrows 8e-8f). This may improve performance because it reduces the number of round trips incurred by the client and also reduces the amount of work performed by the server 804.

Figure 9:
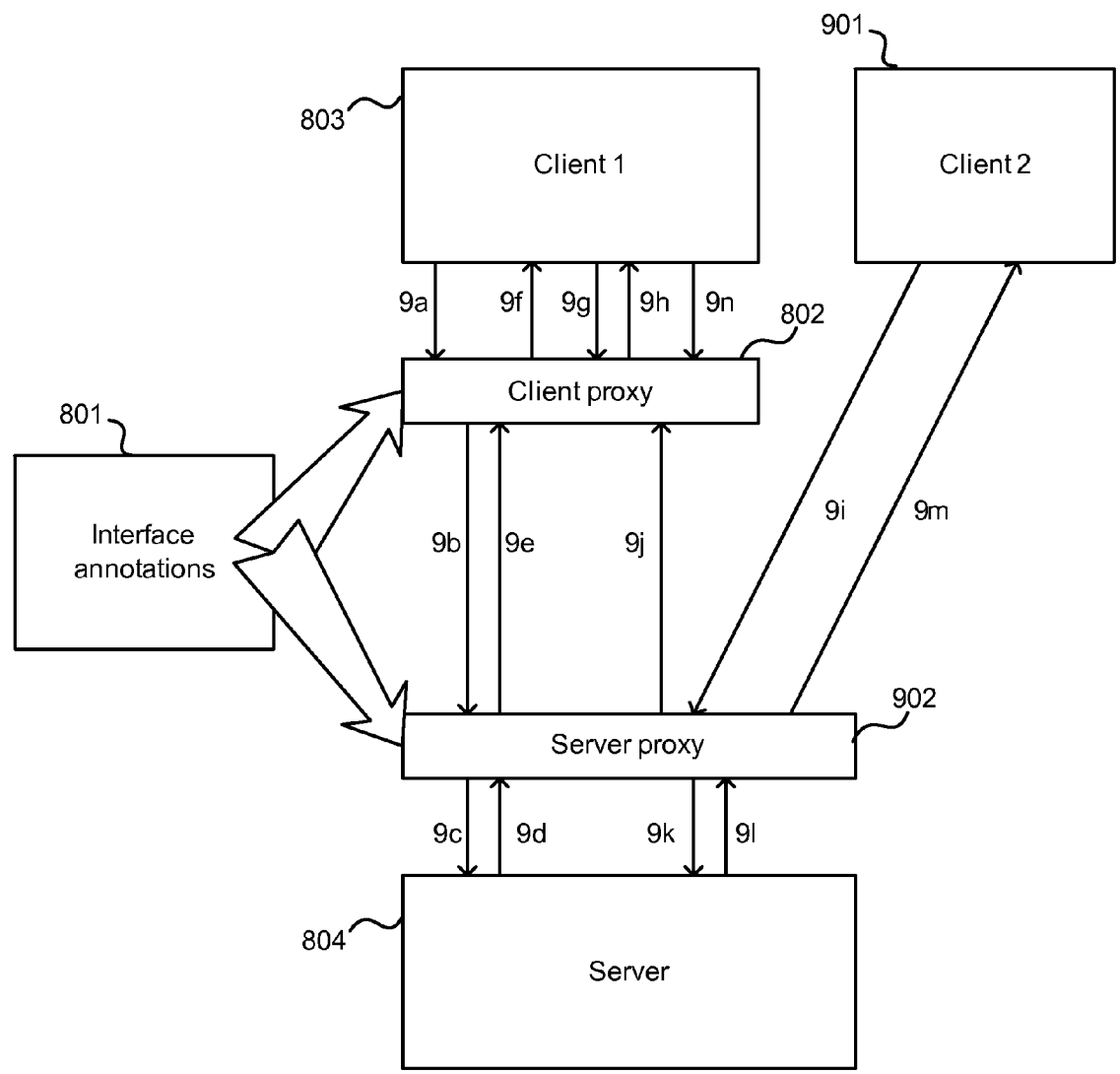

In the situation shown in FIG. 9, a second client 901 is also interacting with the same server 804. If the second client credits money to a bank account in between two balance queries from the first client 803, and the first client continues to use its cached results from the first query, then it will not observe the update made by the second client as there is no explicit synchronization across the interface. One approach in this case is that the abstract implementation 801 is further used to generate a server-side proxy 902 that tracks which information has been cached by which clients and to use this to either (i) send invalidation messages to clients (as shown in FIG. 9), or (ii) to associate short-term leases with cached data and defer conflicting requests until the lease expires. In the example, the first client initially queries the account balance (arrows 9a-9f) and this value is cached and used to respond to a second balance query (arrows 9g-9h). The second client credits money into the account (arrows 9i, 9k-9m) and the server proxy identifies this as an operation which might conflict with operations whose results have been cached at a client (i.e. the result of the earlier balance enquiry by the first client). The server proxy therefore sends an invalidation message (arrow 9j) to the client proxy. If the first client subsequently queries the balance again (arrow 9n), the client proxy will forward the message on to the server to receive a fresh result. In an alternative situation where leases are used, the processing of the credit (arrows 9k-9m) would be delayed until the lease expires (e.g. until the 'use by' date of the value cached at the client proxy 802 expires) and no invalidation message (arrow 9j) would be sent.

Figure 10:
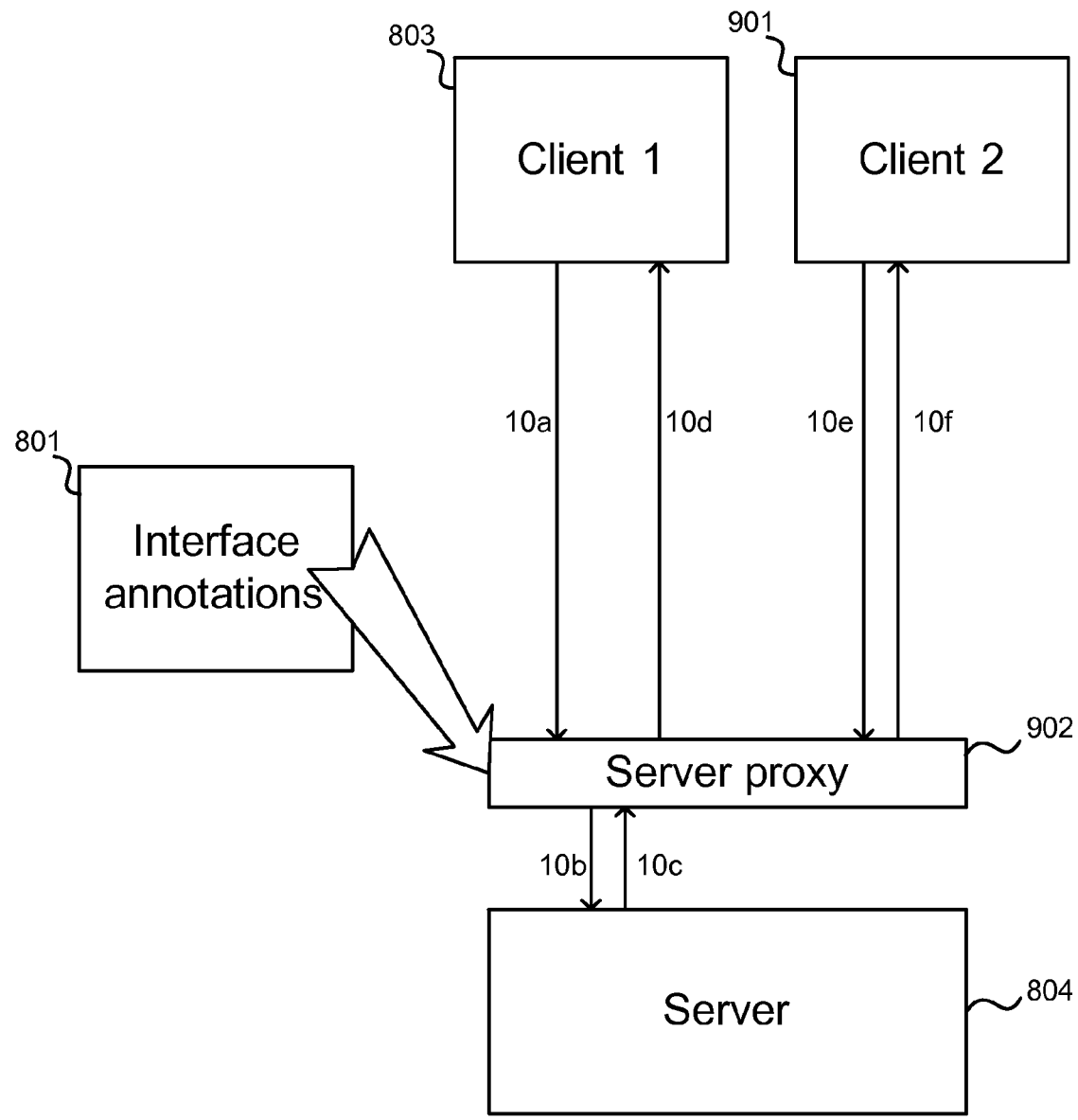

In the situation shown in FIG. 10, a number of clients 801, 901 are performing similar interactions with a server 804. In this case the abstract implementation 801 may be used to generate a server side proxy 902 to track invocations made by one client 803 (arrows 10a-10d, such as a balance request)

and to use these to reply to the second client (arrows 10*e*-10*f*, making the same balance request), reducing the load on the server.

Figure 11:
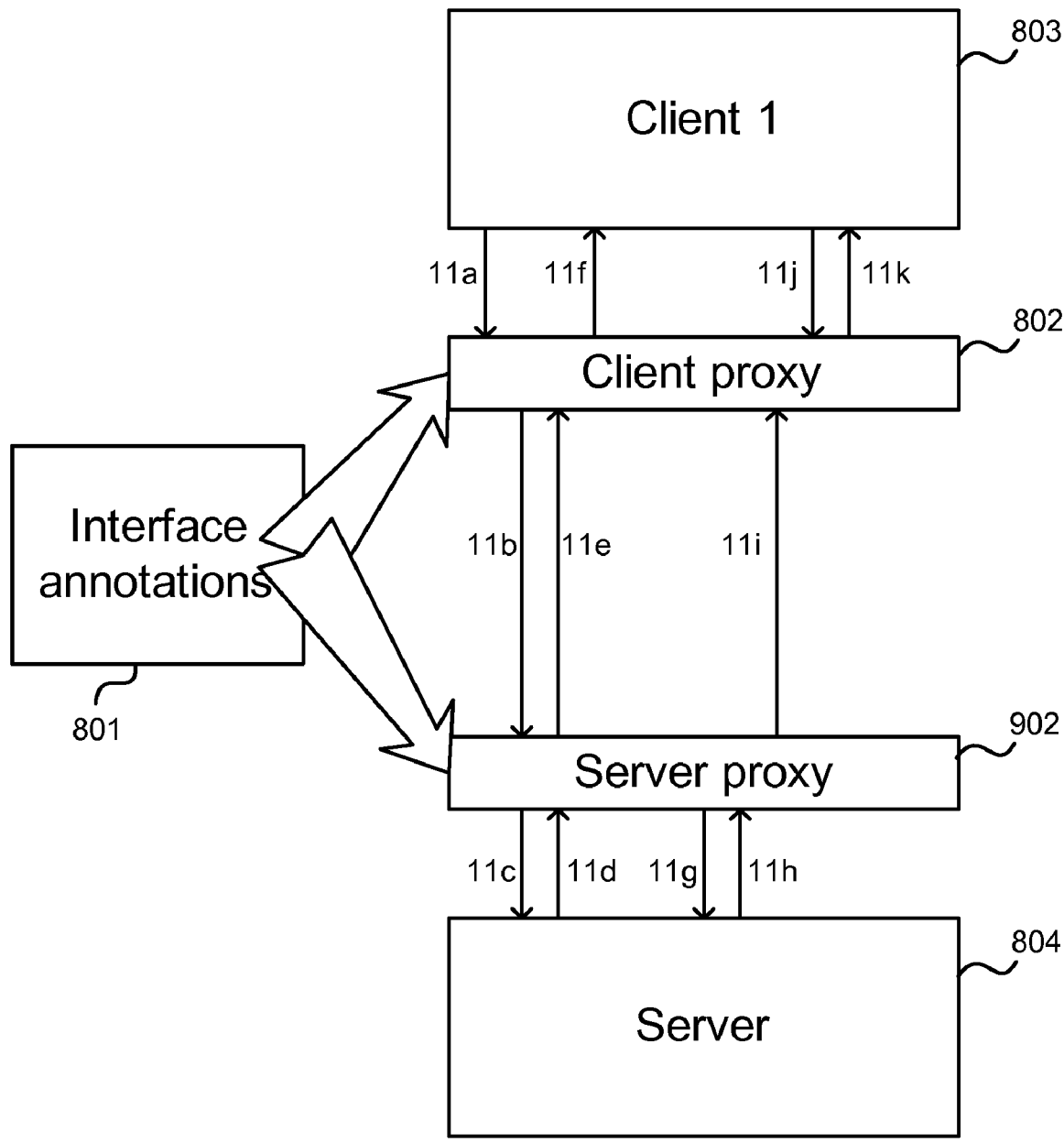

In the situation shown in FIG. 11, the banking application supports two related query operations, e.g. to query the balance in a checking account and a savings account, and that although these are separate operations, profiling determines that they are often issued one after the other. In this case either proxy 802, 902 could speculatively issue the second query after it observes the first. This will reduce the number of network round-trips involved with synchronous RPC. In the example shown in FIG. 11, the server proxy 902 issues the speculative second query (arrows 11*g*-11*h*) after observing the first (arrows 11*a*-11*f*). The result may be held at the server proxy in anticipation of the actual query being received (arrows 11*j*-11*h*) or may be sent to the client proxy 802 (arrow 11*i*). In this example, the abstract implementation indicates that it is correct for the second query to be performed speculatively and a second module (not shown) may be responsible for deciding exactly which correct speculative operations should be performed. In a variation of that shown in FIG. 11, the speculative query may be issued by the client proxy 802. This would mean that the server proxy may not be required but the communication from the client proxy to the server may be slower than communication from the server proxy to the server.

In each of the situations described above, the client proxies store their own abstract state (as shown in FIG. 3), whilst the server proxies store information about the abstract state held at each of the client proxies (where there are both client and server proxies). The abstract implementations 801 provide the proxies 802, 902 with information about which operations conflict with one another, which operations allow their results to be cached, and which operations are safe to issue speculatively. Whilst the proxies are shown as separate entities from the clients and servers, this is by way of explanation only and the client proxy may be compiled into the same application as the body of the client and the server proxy may be similarly combined with the server.

A further example application relates to compile time optimizations for the use of a software transactional memory (STM) library. In this example, the library exposes operations OpenForRead and OpenForUpdate which must be called before the first time that an object is read from or updated within a transaction. These Open* calls provide the concurrency control that is needed for a transaction to appear to execute in isolation from other threads. This may be addressed by the compiler inserting Open* calls before every data access inside a transaction and then removing those that it can prove are redundant e.g. when the object is already open for read or for update. However, this requires modification to several parts of the compiler to be able to do this, and also requires an extension the compiler's intermediate code to include these two Open* operations. However, an alternative solution is to provide an abstract implementation for the STM interface:

```
[FactType("OPEN_FOR_READ(Object) -> bool")]
[FactType("OPEN_FOR_UPDATE(Object) -> bool")]
[DefaultEffect("OPEN_FOR_READ(*) = ?;
  OPEN_FOR_UPDATE(*) = ?")]
public interface STM {
    [Effect("OPEN_FOR_READ(obj) = true")]
    public void OpenForRead(Object obj);
    [Effect("OPEN_FOR_READ(obj) = true;
      OPEN_FOR_UPDATE(obj) = true")]
```

-continued

```
    public void OpenForUpdate(Object obj);
    ...
}
```

In this case the OPEN FOR . . . facts record objects that are known to already be open for transactional access, and the update to both kinds of fact by OpenForUpdate reflects the domain knowledge that update access also grants read access in this system. The DefaultEffect attribute indicates that operations without their own Effect will leave objects in an unknown state (e.g. this may be needed for management operations to start, commit, or abort transactions).

A further application of abstract implementations is the invocation of database stored procedures in the back-end of web applications. Loading a single page can yield dozens of stored procedure calls and many of these calls may be for the same stored procedures, and often with the same arguments and many of the calls may be made redundant by earlier calls in the same page. By using an abstract implementation large savings can be made in the number of procedures called across the interface between the web application and the database.

Another example application relates to a tool that renders an organization chart based on information received from LDAP (Lightweight Directory Access Protocol) queries. Whilst the tool may be responsive when accessed by users co-located with the server, the response time may be significantly increased for remote users because the queries it uses are performed synchronously. Searching for an employee reveals the chain of managers from that employee up to the root of the tree. All of the manager/report relationships are stored on the LDAP server, so sequential queries must be made to obtain these chains. These queries are repeated from the start each time the user navigates to another employee, even though the typical forms of navigation by a user are to an employee's immediate manager, or one of the people that reports to them.

The tool may be built around a class for building management chains. Within this is the method:

public Employee FindEmployee(string name, string [ ] extra)

The second argument is a list of strings that indicate which additional information should be collected from the LDAP server. For these management chain queries, the second argument is just a singleton list containing the string manager.

The simplest form of abstract implementation is to indicate that an Employee object can be re-used when it is the result of a query with the same name and extra information, using Equals/Clone methods on the mutable extra array. The FactType is therefore:

[FactType("EMPLOYEE(String, *String[ ])->Employee")]

The effect annotation on FindEmployee is:

[Effect("EMPLOYEE(name, extra)=return")]

However, an alternative form of annotation is possible at a lower level in the system—placing it in the implementation of the DirectorySearcher class that is used to query the LDAP server, rather than in the implementation of the application. The implementation of FindEmployee uses DirectorySearcher as follows:

```
public SearchResult FindEmployee(string name, string[] extra) {
    Employee.ds.Filter = "(distinguishedname=" + name + ")";
    Employee.ds.PropertiesToLoad.Clear( );
```

```
        if (extra.Length > 0)
        Employee.ds.PropertiesToLoad.AddRange(extra);
        return Employee.ds.FindOne( );
    }
```

The static field ds refers to a DirectorySearcher on which the FindEmployee method performs a series of operations, resulting in a call to FindOne to query the LDAP server. It would be incorrect to simply indicate that the result of FindOne can be re-used—the query itself is built up by the operations on the Filter and PropertiesToLoad properties.

This example illustrates the use of property accessors in abstract implementations. The following annotation could be used:

[FactType("LDAP-RESULT(String, *String[ ])-> SearchResult")]

The effect annotation on FindOne then indicates the dependence on the Filter and PropertiesToLoad properties:

[Effect("LDAP_RESULT(this.Filter, this.PropertiesToLoad)=result")]

In this example, large improvements in performance may be achieved because LDAP queries are often slow, particularly when performed on distant LDAP servers. In such a situation, eliminating even a single redundant query can provide a noticeable improvement in performance. In the example described, the tool can navigate between employees without incurring the network traffic for those employees that have already been seen.

Exemplary Computing-Based Device

Figure 12:
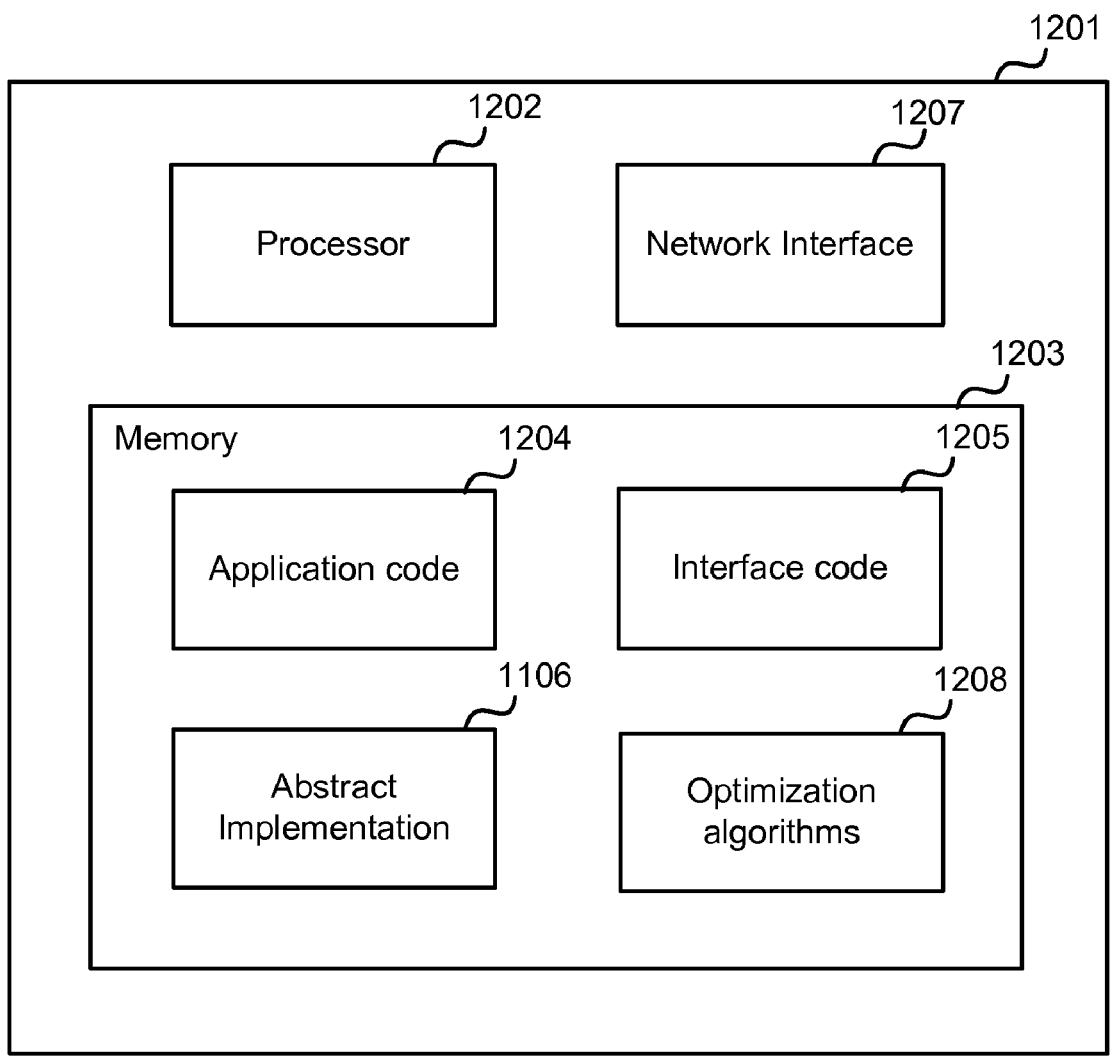
FIG. 12 shows an exemplary computing-based device.

FIG. 12 illustrates various components of an exemplary computing-based device 1201 which may be implemented as any form of a computing and/or electronic device, and in which embodiments of the methods described above may be implemented.

The computing-based device 1201 comprises one or more processors 1202 which may be microprocessors, controllers or any other suitable type of processors for processing computing executable instructions to control the operation of the device in order to perform the code optimizations described above.

The computer executable instructions may be provided using any computer-readable media, such as memory 1203. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory may be further arranged to store the application code 1204 which is being optimized, the interface code 1205 and the abstract implementation data 1206 (which may be combined with the interface code 1205). This data may be accessed from another store external to the computing-based device 1201 via a network interface 1207 and stored in the memory 1203 or alternatively may not be stored in the memory. The memory may also comprise optimization algorithms 1208 which may be used in performing the optimization.

CONCLUSION

The methods described herein may enable a standard compiler to be extended, through the consideration of the higher level information which is contained within the abstract implementation. This may provide the opportunity for additional optimizations at compile time and/or run time. The higher level information may be contained within the interface code or may be located elsewhere. The higher level information may contain fact type data and effect data or the data may be provided in an alternative format with the same overall effect.

Although the present examples are described and illustrated herein as being implemented in a system as shown in FIG. 12, the system described is provided as an example and not a limitation. As those skilled in the art will appreciate, the present examples are suitable for application in a variety of different types of computer systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
   under control of a processor configured with computer-executable instructions, accessing code for optimization, the code for optimization including at least one method call associated with a fact in a system;
   accessing interface code and abstract implementation data;
   using the abstract implementation data to manipulate an abstract state, the abstract state including one or more facts representing the system called by the code for optimization across an interface associated with the interface code; and
   performing code transformations on the code for optimization based at least in part on the abstract implementation data and at least one of the one or more facts included in the abstract state, wherein performing code transformations on the code for optimization comprises:
      determining if the fact in the system is a known fact represented in the abstract state;
      in an event the fact in the system is a known fact represented in the abstract state, retrieving the known fact while not issuing a call to the system across the interface; and
      in an event the fact in the system is not a known fact represented in the abstract state, issuing a call to the system across the interface.

2. A method according to claim 1, wherein the interface code includes the abstract implementation data.

3. A method according to claim 1, wherein the abstract implementation data comprises at least one statement defining an effect of the at least one method call on the fact in the system.

4. A method according to claim 3, wherein the abstract implementation data further comprises a type definition for the fact.

5. A method according to claim 3, further comprising:
   storing data relating to the fact; and
   updating the stored data relating to the fact upon invocation of the at least one method call based on a corresponding statement.

6. A method according to claim 1, wherein performing code transformations on the code for optimization further comprises:
   buffering a plurality of method calls that meet predefined criteria in a queue; and
   performing the code transformations based at least in part on the abstract implementation data over the plurality of method calls in the queue.

7. A method according to claim 5, wherein performing code transformations on the code for optimization further comprises:
   selecting the at least one method call from the code for optimization;
   determining if the at least one method call meets predefined criteria;
   if the predefined criteria are met, placing the at least one method call in a queue; and
   if the predefined criteria are not met, issuing the at least one method call and any earlier method calls in the queue that do not have a commutative effect on the stored data relating to the fact.

8. A method according to claim 1, wherein the code transformations comprise generation of proxy code.

9. A method according to claim 1, wherein the code transformations comprise at least one of: dead code elimination and common sub-expression elimination.

10. A method according to claim 1, wherein the system comprises a library.

11. A method according to claim 1, wherein the abstract state is a representation one or more data elements corresponding to an actual state of the system.

12. A method according to claim 1, wherein the abstract implementation data describes how the abstract state is affected by subsequent method calls initiated when performing the code transformations.

13. One or more device-readable media with device-executable instructions for performing operations comprising:
   accessing code for optimization, the code for optimization including at least one method call associated with a fact in a system;
   accessing interface code and abstract implementation data;
   using the abstract implementation data to manipulate an abstract state, the abstract state maintaining one or more facts known to be true to the system called by the code for optimization across an interface associated with the interface code; and
   performing code transformations on the code for optimization based at least in part on the abstract implementation data and at least one of the one or more facts maintained in the abstract state, wherein performing code transformations on the code for optimization comprises:
      determining if the fact in the system is a known fact represented in the abstract state;
      in an event the fact in the system is a known fact represented in the abstract state, retrieving the known fact while not issuing a call to the system across the interface; and
      in an event the fact in the system is not a known fact represented in the abstract state, issuing a call to the system across the interface.

14. One or more device-readable media according to claim 13, wherein the interface code includes the abstract implementation data.

15. One or more device-readable media according to claim 13, wherein the abstract implementation data comprises at least one statement defining an effect of the at least one method call on the fact in the system.

16. One or more device-readable media according to claim 15, wherein the abstract implementation data further comprises a type definition for the fact.

17. A method comprising:
   under control of a processor configured with computer-executable instructions,
   identifying a plurality of method calls in computer program code which are available for invocation across an interface between an application and a system;
   generating abstract implementation data and an abstract state such that invocation across the interface for one or more of the plurality of method calls is eliminated, wherein the abstract state represents one or more known data elements in the system;
   identifying, in the abstract implementation data, at least one statement defining an effect of one of the plurality of method calls on a fact in the system;
   determining if the fact in the system is a known data element represented in the abstract state;
   in an event the fact in the system is a known data element represented in the abstract state, retrieving the known data element while not issuing a call to the system across the interface; and
   in an event the fact in the system is absent as a known data element represented in the abstract state, issuing a call to the system across the interface.

18. A method according to claim 17, wherein the abstract implementation data maintains a type definition for the fact.

* * * * *